Patented Oct. 8, 1929

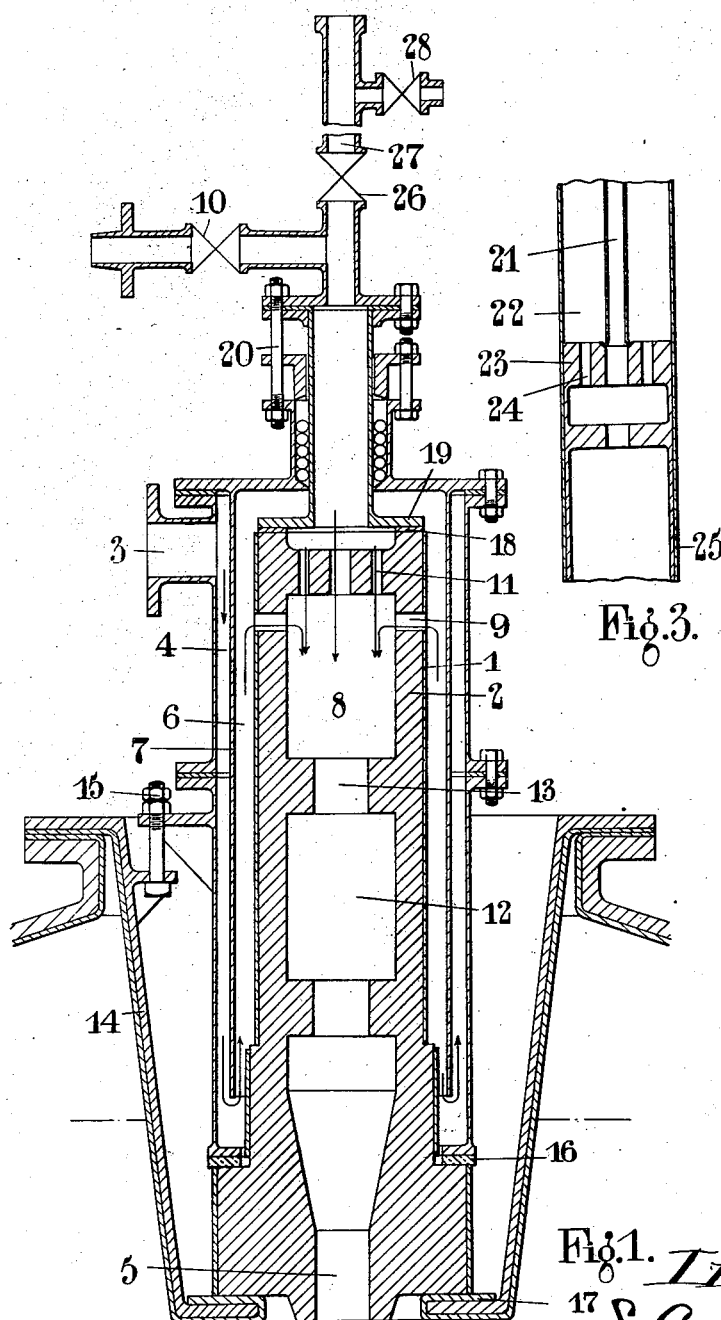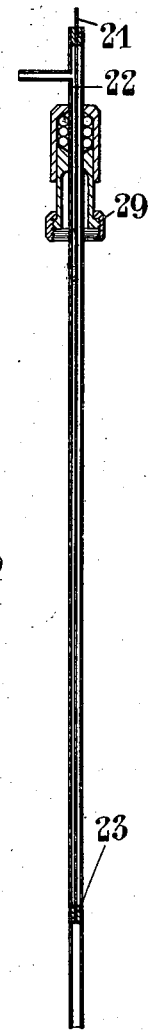
Fig.1. Fig.2. Fig.3.
Inventor
S. C. Smith

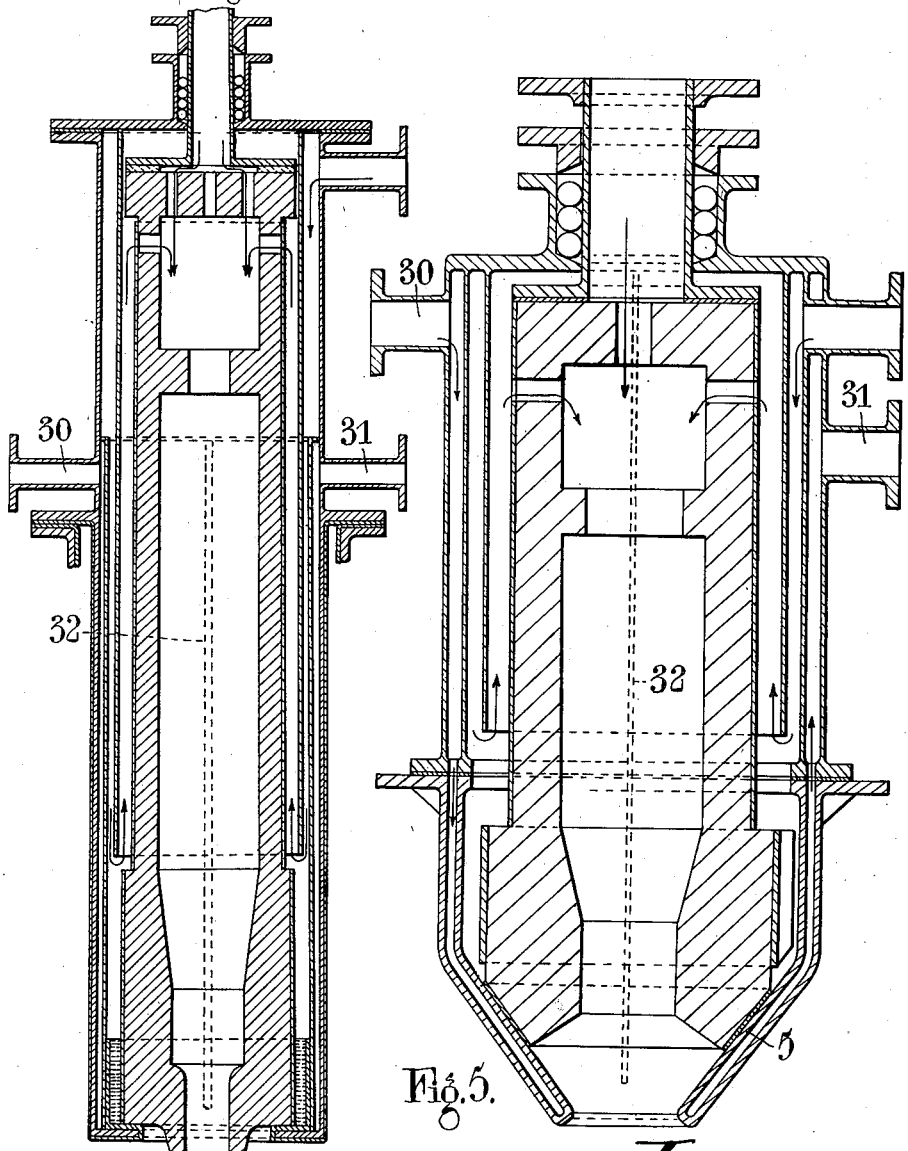

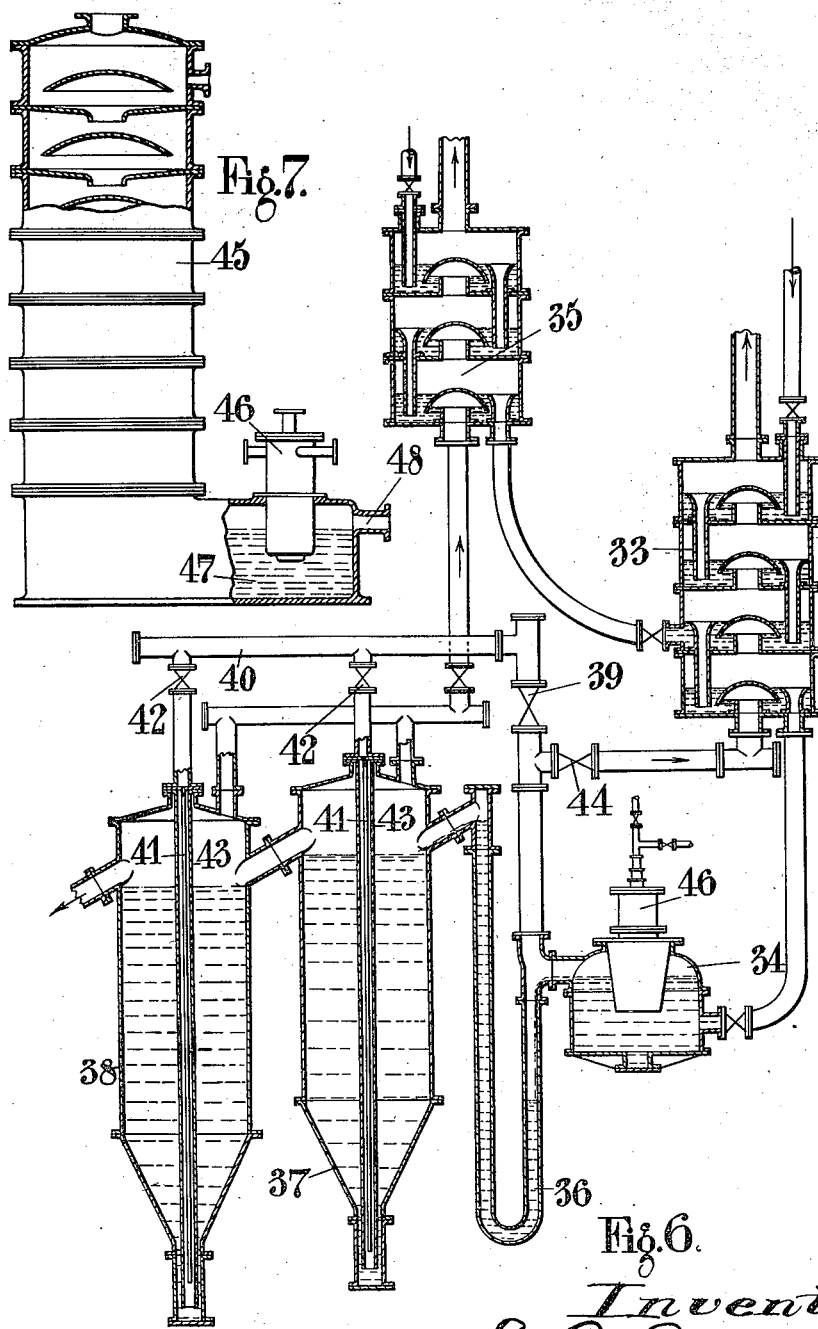

1,730,440

UNITED STATES PATENT OFFICE

STANLEY COCHRAN SMITH, OF LONDON, ENGLAND

HEATING AND/OR CHEMICAL TREATMENT OF LIQUIDS AND MOLTEN MATERIALS BY DIRECT CONTACT WITH COMBUSTION PRODUCTS

Application filed May 4, 1925, Serial No. 27,984, and in Great Britain May 12, 1924.

This invention relates to burners for the treatment of liquids or of substances in the liquid state by direct contact with hot products of combustion or with hot gases resulting from the chemical combination of substances which need not be fuels in the ordinary sense of the term.

Burners for heating liquids have been designed in which the fuel is burnt with the necesssary air in a combustion chamber, the resulting gases issuing directly from the burner into the liquid through a nozzle immersed therein. Such burners as hitherto constructed have certain disadvantages. In most cases combustion is not complete when the gases issue into the liquid. Further, the temperature of the burner walls and casing rises to such an extent that the burner is rapidly destroyed, and there are large heat losses by radiation. In order to overcome the latter objections, the burner may be completely immersed in the liquid, but under certain circumstances this may be impossible, as the amount of liquid may be too small to permit of it, or the liquid-containing vessel may be too shallow.

Burners as hitherto constructed are not suitable for the treatment of liquids under pressure, unless the burner is completely enclosed within the heating vessel, as at the high temperature of the burner walls the latter are unable to resist for prolonged periods the internal pressure necessary to force the combustion products through the liquid in the heating vessel.

According to the present invention, the burner, which consists of a metal casing lined with refractory material, is provided with an external jacket through parts or all of which may be passed the fuel or the air or other supporter of combustion on its way to the combustion chamber, whereby the metal casing of the burner is cooled and its strength preserved, and radiation losses are eliminated by the cooling of the external surface of the burner. Further, combustion is completed before the products of combustion leave the burner to enter the liquid in which the nozzle of the burner is immersed, and the said products of combustion carry with them into the liquid all the heat of combustion. The burner can, when desired, be used with only the nozzle immersed.

In carrying the invention into effect, the constituents for combustion are supplied under suitable pressure to the burner, and one or more of them is or are preheated by passing through the jacket surrounding the burner, before entering the combustion chamber. The hot gases, containing practically all the heat of combustion, are discharged from the burner through a nozzle immersed in the liquid to be heated.

The fuel may be either solid, in the pulverized form, or liquid or gaseous, and the supporter of combustion may be air or oxygen or any other gas adapted to evolve heat by its chemical combination with the fuel, which latter need not necessarily be carbonaceous. The substance to be heated may be an ordinary liquid, or it may be a suspension or a molten substance, and it may be desired to react chemically thereon by the hot gases, in addition to heating it. In such cases the constituents for combustion must be chosen so that the hot gases will have the necesssary composition for the required reaction. In other cases substances other than ordinary carbonaceous fuels may be used for the heating. For example, sulphur and air or oxygen may be used in the burner for the heating and concentration of sulphuric acid in the heating vessel, by the hot sulphur dioxide resulting from the combustion, and the sulphur dioxide subsequently used in the manufacture of sulphuric acid.

Referring to the accompanying drawings:—

Figure 1 is a sectional view of a burner constructed according to my invention;

Figure 2 is a sectional view of the torch for lighting the burner;

Figure 3 is a detail view of the burner end of the torch;

Figure 4 is a sectional view of a modified form of my burner;

Figure 5 is a sectional view of a form of burner suitable for immersion in molten metals and the like;

Figure 6 shows diagrammatically an arrangement of my burner in combination with a heating vessel, leaching vessels and dephlegmating columns;

Figure 7 shows an application of my burner to a combined heater, agitator and heat-absorbing tower;

Figure 8:
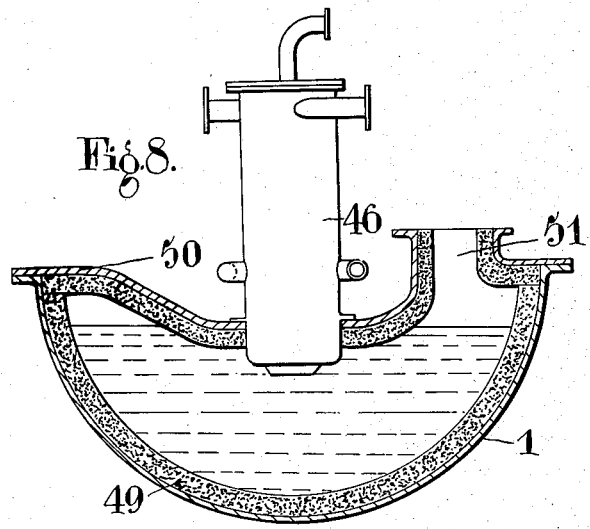
Figure 8 shows an application of my burner to the production of zinc oxide from molten zinc.

Referring to Figure 1, which shows a section of one form of my burner as arranged for use with gaseous fuel, the burner consists of a cylindrical metal casing 1, having a lining 2, of refractory material. This is provided with an air jacket as shown. Air for the combustion of the gas enters at the branch 3, into the outer annular passage 4. It passes along the space 4 towards the nozzle 5, and returns through the inner concentric annular passage 6, which is separated from the passage 4 by the partition 7. It then enters the mixing chamber 8 through the holes 9.

Gas is admitted through the valve 10, and passes through the holes 11, into the mixing chamber 8. The branch 3 may be arranged so that the air enters tangentially into the passage 4, and it may be guided spirally by suitable guides or baffles. More than one air inlet, such as 3, may be used if desired, and the holes 9 may be tangential so as to secure better mixing of the air and gas. By this method of jacketing the air for the combustion is preheated in the burner itself, and the exterior of the burner is cooled and radiation losses practically eliminated. The refractory material of the burner and its reinforcement, 1, are also cooled thereby and the structure preserved. Instead of using only two air passages, 4 and 6, I may cause the air to pass more than once to and fro along the burner before entering the mixing chamber 8. I effect this by providing two or more partitions, such as 7, separated by corresponding partitions suitably arranged as baffles. By these means the temperature of the exterior of the burner may be kept down to any desired degree. The space, 12, which forms the combustion chamber may be connected with the mixing chamber by a passage 13, of reduced diameter, or the interior of the burner may be of uniform diameter throughout, but preferably the gas is passed through at least one contracted diameter, which may be either at the nozzle or some distance above it.

The mixing chamber 8, and the combustion chamber 12, are lined with refractory material, such as carborundum, and the nozzle, 5, is formed of similar or other material, which must be non-corrodible if corrosive liquors are to be treated. In certain cases where the nozzle and parts of the combustion chamber are exposed to the action of materials which readily form fusible slags, I may construct these parts of graphite or other refractory forms of carbon; in such cases care must be taken that these parts are not exposed to oxidizing conditions. The refractory lining is encased in and held together by cylinders or rings, such as 1, made of selected heat resisting material, such as one of the chrome iron alloys.

The burner is bolted to a seating 14, by bolts 15, to ensure a tight joint at the seatings 16 and 17, and the joint at the seating 18 is made by means of the flange 19, and the bolts 20.

For use with corrosive liquors the seating 14 of metal must be protected by a coating of non-corrodible material, and I have found that even such a substance as rubber may be used for this purpose by reason of the remarkable fact that in burners of the type described the temperature of the nozzle at its delivery end is practically the same as that of the liquid. The use of such a substance as rubber is of course subject to the condition that the temperature of the liquor is not so high as to destroy the rubber. Suitable materials other than rubber may of course be used for the protective coating, such as, for example, non-corrodible cements, brickwork or the like.

Ignition is effected by means of a torch, the construction of which is shown in Figure 2, the details of the burner end of the torch being shown to an enlarged scale in Figure 3. Gas and air are supplied to the torch in the correct proportions through flexible pipes, the gas to the narrow central tube 21, and the air to the outer annular space 22. The lower end of the tube 21 is cemented into a plug 23 of refractory material perforated with holes 24, for the passage of the air. The extension of the torch below the plug 23 is lined with refractory material 25, as shown. The object of this extension is to prevent the flame from being extinguished when the main gas and air supplies are turned on.

The method of ignition is as follows:—The air supply to the main burner is opened and the liquid to be heated is introduced into the heating vessel until the nozzle is immersed to the required depth, the gas valve 10, Figure 1, and the valves 26 being both closed. The torch is now lighted and its end inserted into the space 27, the valve 28 being opened slightly to allow the products of combustion to escape. The gland 29, Figure 2, is now secured. The torch will continue to burn in the space 27, Figure 1. The valve 26 is now opened slightly, and a certain quantity of air will escape through 28 with the products of combustion. The valve 28 is now closed and 26 opened fully, and the products of combustion will now pass with the air through the nozzle into the liquid. The torch is now pushed down through the gland 29 and the open valve 26 into the combustion chamber 12, and the gas turned on in the correct proportion, when the main supply of gas will ignite, as can be seen through an inspection hole provided for the purpose if desired. When ignition is properly effected the supply to the torch is cut off and the torch is withdrawn into the chamber 27, the valve 26 closed, and the torch removed. In the case of extinction of the burner from any cause it may be relighted in this way without interfering with the working of the system.

Combustion takes place in the combustion chamber 12, and the hot gases pass downwards through the lower part of the burner, combustion being completed therein. In the immediate neighbourhood of the outlet orifice they meet with liquid. The gases heat and evaporate this liquid and the greater portion of the heat of the gases is thereby transferred as latent heat of vaporization. The vapour of the liquid passes with the gases into the liquid, and is partly or wholly condensed therein, raising its temperature as desired.

If it is desired to reduce as far as possible the liquid entering the nozzle, the latter must be designed in such a way as to get a high coefficient of discharge.

In the form of burner shown in Figure 1 the burner does not come into contact with the liquid and does not require to be protected from corrosive action, the protective coating being applied to the seating.

The whole burner may, if desired, be immersed in the liquid provided that it is adequately protected against corrosive action. In this case the fuel is being burned in a submerged combustion chamber.

Figure 4 represents a modified form of burner suitable for immersion in the liquid to be treated, which may be partly water-jacketed as shown, the water entering the branch 30, and leaving at the branch 31, being prevented from passing directly from the inlet 30 to the outlet 31 by two fins 32. The air for combustion is heated in a similar manner to that described with reference to Figure 1.

As the nozzle has to withstand the action of the liquor in which it is immersed it must be made of material selected accordingly; for example, it may be carborundum, which resists the action of liquors containing hydrochloric acid, or it may be of volvic stone. In cases where the material being treated is at a high temperature, I may use a water-cooled nozzle of suitable material, for example, in heating molten lead a water-cooled steel nozzle may be used as shown in Figure 5. In this form of burner the nozzle itself is of steel which projects beyond the refractory lining. The nozzle 5 is cooled by water entering at 30, circulating round the nozzle, and leaving at 31. The fins 32 act in the same way as described with reference to Figure 4.

When the fuel and the supporter of combustion are mixed before entering the combustion chamber, as may be done if desired, the velocity of influx must be sufficiently high to prevent firing back by backward propagation of flame. In such cases, i. e., when mixing takes place before entering the combustion chamber, it is not necessary that both should be compressed, but the fuel, particularly when it is a gas, may be drawin into the combustion chamber by using air under pressure and taking advantage of the well-known venturi effect. Gaseous, liquid or finely divided solid fuel may be used with appropriate arrangements to ensure complete combustion before the products leave the combustion chamber.

When it is desired to obtain steam free from the products of combustion, I use a heating vessel in which a high pressure is maintained and in which in consequence the temperature of the liquid is high, and I cause this liquid to circulate through another vessel at a lower pressure. Steam free from products of combustion can then be drawn off from this vessel.

In order to utilize further the residual heat of the burnt gases which emerge through the liquor saturated or nearly saturated with the vapour of the liquor at the temperature of the working, I may cause the gases to pass through a column of the type of a gas washer, or that known as a dephlegmating column, when they meet with a liquor counter current, and which may be constructed for instance after the manner of an ammonia distillation column, for example, of the construction shown at 33 in Figure 6.

I have shown in Figure 6 of an application of my heating system to the treatment of ores with hot acid brine. The heating vessel 34 is provided with a burner 46, of one of the types described. The liquor to be heated enters at the top of either or both of the towers 33 and 35, where it meets the ascending gases and passes downwards to the heating vessel. The hot liquor overflows and passes through the pipe 36 to the leaching vessel 37, the pressure in 34 being sufficient to raise the liquor the necessary height. The overflow from the leaching vessel 37 passes into the leaching vessel 38, from which it can be drawn off through a liquid sealed outlet for treatment. In order to agitate the contents of the vessels 37 and 38, and to ensure the whole of their contents being brought into contact with the hot acid, I use a part of the hot gases issuing from the heating vessel in the following manner:—Gases from the heating vessel, 34, pass through the valve 39 into the main 40. Each of the leaching vessels 37 and 38 is provided with a device of the nature of an air lift consisting of a central tube 41 supplied with gases from the main 40 through the valves 42. The central tube 41 is surrounded by a tube 43 of larger diameter extending nearly to the bottom of the leaching vessel. The gases from the main 40 pass downwards through the central tube 41, and return upwards through the tube 43, carrying with them a portion of the pulp from the bottom of the leaching vessel, thus maintaining the solids in suspension. In this way a thorough mixing of the hot acid with the material to be treated is ensured. The gases need not all be used in this way, but a portion of them may be passed through the valve 44 into the column 33. In their upward passage through this, they meet with the liquid which is passing to the heating vessel.

In the arrangement shown in Figure 6, the gases from the leaching vessels are passed into a column 35, but any convenient similar arrangement may be used.

In Figure 7 I have shown an application of the burner to a combined heater, agitator and heat absorbing tower. The pulp to be treated enters at the top of the column 45, and passes downwards over the trays to the bottom of the tower meeting the ascending gases and absorbing heat from them. The burner 46 is fitted to an extension 47 at the base of the tower, and the pulp after falling through the tower 45, passes through the chamber 47, flows past the burner and leaves by the outlet 48.

My method of heating may equally well be applied to substances which are not liquid except at elevated temperatures, such as molten lead, sulphur and the like. The nozzle of the burner is immersed in the molten substance in the same way as already described for the case of ordinary liquids, and the exit gases from the burner pass through the molten substance. I arrange the fuel supply so that these gases shall be neutral, oxidizing or reducing, according to the purpose of the operation. When operating on substances which are at a high temperature, I take precautions to prevent premature ignition of the fuel, either by introducing the fuel and the air or oxygen separately into the combustion chamber or by cooling the pipe conveying the mixture to the combustion chamber. The outside of the burner may be in such cases advantageously protected by circulation of water. The burner shown in Figure 4 is suitable for use in this way.

The nozzle may be cooled by circulation of steam instead of water if desired.

As one example of utilizing my burner for such purposes, I may convert zinc into zinc oxide. In Figure 8 I have shown an apparatus by means of which this may be effected. Molten zinc is contained in the vessel 1, which is constructed of cast iron lined with a suitable refractory material 49. A burner 46, preferably with a water cooled nozzle, is fitted to the cover 50 of the vessel. The supplies of gas and air are regulated so that the products of combustion are oxidizing. Zinc vapour or oxide of zinc, and in some cases a mixture of both, pass away by the outlet 51, and a further supply of air may be introduced into the exit vapours to complete the oxidation. If desired the whole of the air required for oxidation of the zinc vapour may be introduced into the stream of vapour. The vapours are cooled and collected in known manner. The necessary supplies of metal may be introduced into the vessel 1 through a suitable charging device in the cover 50.

Figure 9:
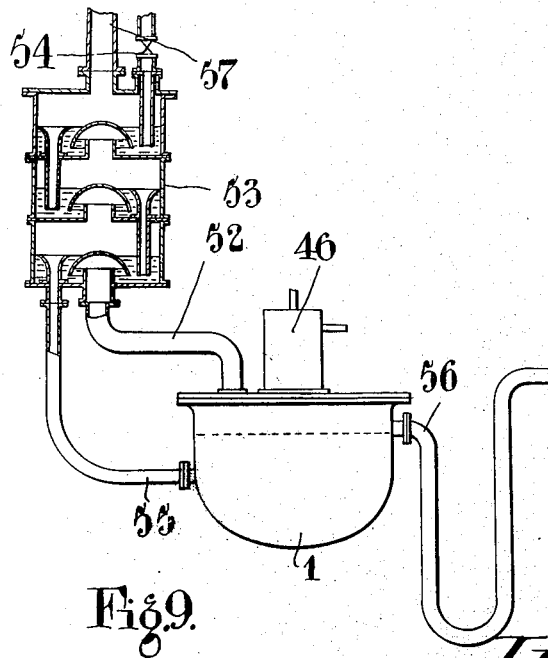
Figure 9 shows an application to the manufacture of sulphuric acid.

In the modification illustrated by Figure 9, 46 is a burner of the type previously described in which sulphur vapour is completely burnt with air. The pipe leading the sulphur vapour into the burner may be lined with non-corridible refractory material. The nozzle of the burner is immersed in sulphuric acid which is being concentrated by heat in the vessel 1. The gases passing through the acid and containing sulphur dioxide proceed by means of the acid resisting pipe 52 into the tower 53, also constructed of acid resisting material. The gases pass upwards through the tower and meet a descending stream of the acid to be concentrated which is introduced at the top of the tower through the pipe 54, and passes to the heating vessel through the pipe 55. The concentrated acid leaves by the liquid sealed pipe 56. The vapours leave the tower at the pipe 57, and are subsequently employed in any known manner for the production of sulphuric acid. The excess air necessary for the conversion of the vapours into sulphuric acid may be introduced in whole or in part at different points, for example after the vapours have passed through the tower, in the combustion chamber, or immediately following the combustion chamber. In some cases the air may be introduced at various different points in the tower, combustion chamber and before the gas enters the liquid in the vessel 1.

According to another example I may employ in the combustion chamber a mixture of such gases as hydrogen and chlorine alone or in mixture with other inert or combustible gases, and in such proportions as to form hydrochloric acid, and I may immerse the outlet of the combustion chamber in water so as to produce hydrochloric acid which I may raise to any desired temperature, or I may immerse the nozzle in any liquor or suspension where I desire to bring about a reaction by means of the hydrochloric acid, particularly where it is necessary to raise the temperature of such liquor or suspension, e. g., treating ores with hot hydrochloric acid brine. The finely divided ore is maintained in suspension by elastic fluid lift means or in any other suitable manner.

Where it is desired to concentrate or heat liquors which would be affected by the passage of carbon dioxide through them, I may employ a mixture of hydrogen and air or oxygen, particularly in connection with the concentration of caustic soda. I may utilize the hydrogen evolved in the electrolytic manufacture of caustic soda for this purpose.

In many operations it is frequently desirable to bring about a chemical reaction by means of carbon dioxide, and I may advantageously employ the products of combustion after carrying out any operations of heating or evaporation and removal if desired of the water vapour for such purpose.

This form of the invention is particularly suitable where it is necessary or desirable to heat the liquor during the passage of the carbon dioxide, and I may immerse the outlet of the combustion chamber in the liquor or suspension, as for example in the decomposition of a solution of barium sulphide to prepare the barium carbonate and to liberate sulphuretted hydrogen. In like manner by employing sulphur or sulphuretted hydrogen in the combustion chamber I may introduce sulphur dioxide into a liquor or suspension, and if desired simultaneously heat the liquor or suspension.

I may employ my method of heating for the distillation of ammonia by causing the solution containing ammonia to pass through the dephlegmating tower and into the chamber containing the burner in the manner previously described. It will be understood that in such case the ammonia evolved is mixed with the products of combustion and requires to be separated therefrom.

Where I desire to avoid the production of non-condensible products of combustion I may employ a mixture of hydrogen and oxygen and control the temperature inside the combustion chamber by the introduction of steam.

I may of course employ according to my invention the heat produced by the combustion of sulphur for one or more of various purposes such as the production, heating and concentration of sulphites or bisulphites by, for example, admitting the sulphur dioxide formed into a suitable liquid or suspension containing a material which will combine with the sulphur dioxide to give a sulphite or bisulphite, for instance, with milk of lime.

I claim:

1. Apparatus for heating substances in a liquid state by direct contact with combustion products, comprising, a vessel for containing the substance being treated, a burner inserted in said vessel comprising a cylindrical refractory lined and pressure-resisting combustion chamber, a larger diameter cylindrical pressure-resisting outer casing concentrically surrounding and forming a joint at one end with said chamber, said casing providing an annular space around said chamber, a reduced area outlet at one end of said chamber, a cylindrical partition within and concentric with said annular space dividing the latter into two parts for the greater part of its length from the end thereof remote from the outlet end of the chamber, means for admitting constituents for combustion into the outer part of the space divided by said partition, means for passing said constituents into the inner part of said divided space, means for admitting said constituents from said inner part of the divided space more or less radially into the interior of the combustion chamber at points thereof remote from the outlet end and means for admitting at least one other constituent more or less axially into said chamber at a point not greatly remote from said last-mentioned points direct from the exterior of the outer casing.

2. Apparatus for heating substances in a liquid state by direct contact with combustion products, comprising, a vessel for containing the liquid substance being treated, a burner in said vessel comprising a cylindrical combustion chamber, a larger diameter cylindrical outer casing surrounding and forming a joint at one end with said chamber, the interior of the latter being of substantially uniform diameter throughout its length and having at least one reduced diameter portion, one of which is at one end of said chamber and forms a nozzle outlet therefrom.

3. Apparatus for heating substances in a liquid state by direct contact with combustion products, comprising, a vessel for containing the liquid substance being treated, a burner in said vessel comprising a cylindrical combustion chamber, a larger diameter cylindrical outer casing surrounding and forming a joint at one end with said chamber, the interior of the latter being of substantially uniform diameter throughout its length and having at least one reduced diameter portion, one of which is at one end of said chamber and forms a high coefficient nozzle outlet therefrom, and means for protecting said burner from corrosive action.

4. Apparatus for heating substances in a liquid state by direct contact with combustion products, comprising, a vessel for containing the liquid substance being treated, a burner in said vessel comprising a cylindrical combustion chamber, a larger diameter cylindrical outer casing surrounding and forming a joint at one end with said chamber, the interior of the latter being of substantially uniform diameter throughout its length and having at least one reduced diameter portion, one of which is at one end of said chamber and forms a nozzle outlet therefrom and means for preheating said liquid substance prior to bringing it into the vicinity of the burner.

5. Apparatus for heating substances in a liquid state by direct contact with combustion products, comprising, a vessel for containing the liquid substance being treated, a burner in said vessel comprising a cylindrical combustion chamber, a larger diameter cylindrical outer casing surrounding and forming a joint at one end with said chamber, the interior of the latter being of substantially uniform diameter throughout its length and having at least one reduced diameter portion, one of which is at one end of said chamber and forms a nozzle outlet therefrom with a high discharge coefficient, means for protecting said burner from corrosive action and a column or tower for preheating said liquid substance prior to bringing it into the said vessel.

6. Apparatus for heating substances in a liquid state by direct contact with combustion products, comprising, a vessel for containing the liquid substance being treated, a burner in said vessel comprising a cylindrical combustion chamber, a larger diameter cylindrical outer casing surrounding and forming a joint at one end with said chamber, the interior of the latter being of substantially uniform diameter throughout its length and having at least one reduced diameter portion, one of which is at one end of said chamber and forms a nozzle outlet therefrom, and means for introducing an igniting torch into said burner comprising a gas-tight compartment at the end of the latter remote from the nozzle end, said compartment communicating with the combustion chamber being isolatable therefrom by means of a valve and having a controllable outlet for burnt gases.

7. Apparatus for heating substances in a liquid state by direct contact with combustion products, comprising, a vessel for containing the liquid substance being treated, a burner in said vessel comprising a cylindrical combustion chamber, a larger diameter cylindrical outer casing concentrically surrounding and forming a joint at one end with said chamber, the interior of the latter being of substantially uniform diameter throughout its length and having a reduced diameter portion at one end forming a nozzle outlet therefrom, and means for bringing a cooling fluid into heat exchange relationship with the exterior of the combustion chamber at a region thereof adjacent the said nozzle outlet.

8. Apparatus for heating substances in a liquid state by direct contact with combustion products, comprising, a vessel for containing the liquid substance being treated, a burner in said vessel comprising a cylindrical combustion chamber, a larger diameter cylindrical outer casing concentrically surrounding and forming a joint at one end with said chamber, the interior of the latter being of substantially uniform diameter throughout its length and having a reduced diameter portion at one end forming a nozzle outlet therefrom, means for bringing a cooling fluid into heat exchange relationship with the exterior of the combustion chamber at a region thereof adjacent the said nozzle outlet and a non-corrodible coating applied to the exterior of the burner.

9. Apparatus for heating substances in a liquid state by direct contact with combustion products, comprising, means for maintaining the liquid substance being treated, and a burner comprising a cylindrical combustion chamber, a larger diameter outer casing concentrically surrounding said chamber and providing an annular space around the latter, a nozzle outlet at one end of said chamber, at least one cylindrical partition within said annular space dividing the latter for a portion of its length from one end, means for admitting at least one constituent for combustion into the outermost part of the divided space, means for passing said constituent to the innermost part of the divided space, means for admitting said constituent to the interior of the combustion chamber from said innermost part of the divided space, means for admitting at least one other constituent into the combustion chamber direct from the exterior of the outer casing, and a further cylindrical partition extending from a region adjacent the nozzle outlet end of the combustion chamber for at least a portion of the length of the outer casing and forming a joint therewith at said region, said additional partition occupying a position between said outer casing and the first-mentioned partition concentric therewith and dividing the annular space between them into a further two annular parts isolated one from the other, means for admitting a cooling fluid into the outermost of said isolated annular parts and means remote from said last-mentioned means providing an outlet for said fluid.

10. Apparatus for heating substances in a liquid state by direct contact with combustion products, comprising, a vessel for maintaining the molten substance being treated, a burner in said vessel comprising a combustion chamber, a larger diameter cylindrical outer casing concentrically surrounding said chamber and providing an annular space around the latter, a nozzle outlet at one end of said chamber, at least one cylindrical partition within said annular space dividing the latter for a portion of its length from one end, means for admitting constituents for combustion into the outermost part of the divided space, means for passing said constituents to the innermost part of the divided space, means for admitting said constituents to the interior of the combustion chamber from said innermost part of the divided space, means for admitting at least one other constituent into said combustion chamber direct from the exterior of the outer casing, and a further cylindrical partition extending from a region adjacent the nozzle outlet for the full length of the outer casing, said additional partition being positioned concentric with and between the outer casing and the first-mentioned partition dividing the annular space between them into a further two mutually isolated annular parts, said outer casing and additional partition extending beyond the outlet end of the combustion chamber in converging frusto-conical form and meeting beyond the end of the combustion chamber on a circle coaxial with and of somewhat greater diameter than the outlet from said chamber, means for admitting a cooling fluid into the outermost of the isolated annular spaces and means remote from said last-mentioned means providing an outlet for said fluid.

11. In the method which comprises heating substances in a liquid state by passing directly thereinto below the surface thereof hot elastic fluid resulting from combustion, the steps of commencing said combustion in a comparatively small space under pressure and in close proximity to the liquid substance but out of heat exchange relationship therewith, and controlling the combustion to effect completion thereof under like conditions before passing the resulting hot products into the liquid substance.

12. In the method which comprises heating substances in a liquid state by passing directly thereinto below the surface thereof hot elastic fluid resulting from combustion, the steps of commencing combustion of substances adapted to combine exothermically forming a substance chemically reactive with said liquid substance in a comparatively small space under pressure and in close proximity to the liquid substance but out of heat exchange relationship therewith, and controlling the combustion to effect completion thereof under like conditions before passing the resulting hot products into the liquid substance.

13. Apparatus for heating substances in a liquid state by direct contact with combustion products, comprising a vessel for containing the liquid substance being treated, a burner in said vessel comprising a cylindrical combustion chamber, a larger diameter cylindrical outer casing surrounding and forming a joint at one end with said chamber, the interior of the latter being of substantially uniform diameter throughout its length and having at least one reduced diameter portion, one of which is at one end of said chamber and forms a nozzle outlet therefrom and means for passing vapours evolved from the liquid substance in said vessel into intimate contact with a portion of said liquid substance and so effecting preheating thereof prior to passing same into said vessel.

14. In apparatus for heating substances in a liquid state by direct contact with hot combustion products, comprising a container vessel for said substance, means for passing the substance into said vessel, and means for effecting removal of said substance, a burner inserted in an opening in the top of said vessel with its outlet immersed in the liquid, said burner comprising a cylindrical refractory lined combustion chamber, a nozzle outlet of high discharge coefficient at one end of said chamber, a refractory lined chamber for effecting mixing of the combustion constituents and communicating by a reduced diameter portion with the other end of said combustion chamber, a larger diameter cylindrical outer casing concentrically surrounding said chambers providing an annular space around the same and forming a joint with the exterior of the combustion chamber near to the nozzle end, a cylindrical partition within said annular space dividing the latter for a portion of its length from the mixing chamber end, means for admitting at least one constituent for the combustion into the divided space for preheating therein and simultaneously cooling the exterior of the chambers and preventing heat loss therefrom by radiation, ports in the wall of the mixing chamber for admitting said preheated constituent into the interior thereof, and means for admitting at least one other constituent into said mixing chamber direct from the exterior of the burner.

15. Apparatus for heating substances in a liquid state by direct contact with combustion products, comprising means for maintaining the liquid substance being treated, and a burner comprising a cylindrical combustion chamber, a larger diameter cylindrical outer casing concentrically surrounding said chamber and forming a joint therewith adjacent one end thereof, an outlet for combustion products at said end of the chamber, at least one cylindrical partition between said outer casing and the exterior of said combustion chamber providing endwise communicating concentric annular spaces shrouding the combustion chamber for a substantial portion of its length from one end, means for admitting at least one constituent for combustion into the outermost annular space so as to travel substantially axially along same into the communicating innermost annular space, means for admitting said constituent after travel thereof in a reverse sense into the interior of the combustion chamber and separate means for admitting at least one other constituent into said combustion chamber direct from the exterior of the outer casing.

In testimony whereof I have signed my name to this specification.

STANLEY COCHRAN SMITH.